United States Patent Office 3,371,778
Patented Mar. 5, 1968

3,371,778
METHOD OF TREATING STARCHES FOR
FLOTATION OF MINERALS
Iwao Iwasaki, Minneapolis, Minn., assignor to The
Regents of the University of Minnesota, Minneapolis, Minn., a corporation of Minnesota
No Drawing. Filed Feb. 12, 1965, Ser. No. 432,395
11 Claims. (Cl. 209—3)

ABSTRACT OF THE DISCLOSURE

A method of concentrating finely divided oxidized iron ores in which the gangue material is principally siliceous by froth floation of the gangue away from the iron constituents based upon the discovery that good metallurgical results can be obtained with reduced amounts of starch depressant if the starch is gelationized and subjected to violent shearing action before addition to the ore pulp.

---

This invention relates to a method of preparing starch solutions for use in the froth flotation of ores, and to ore concentration processes utilizing starch solutions prepared by this methd. The use of starch as a depressant in flotation is well known. It is used, for example, in the separation of siliceous gangue particles from oxidic iron mineral particles, of copper minerals from molybdenite, of galena from chalcopyrite and sphalerite, of apatite from ilmenite, of fluororspar from calcite, of sylvite from halite in the presence of clay, etc.

One method of separating siliceous gangues from oxidic iron minerals by a froth flotation process uses any one of various anionic collecting agents, in conjunction with a calcium ion activating substance, such as lime or calcium chloride, and aqueous solutions of starch dispersed by any one of several methods. Various collector such as red oil, tall oil, marine oil, various higher fatty acids and resin acids or the soaps thereof, or various mixtures of these materials, have been used. The starch has been dispersed by heating it in water, usually acids, alkalis or oxidizing agents, or by contacting with water and certain of these agents at room temperature for longer periods of time. The pulped oxidic iron mineral particles are coated with the starch preferentially and are selectively depressed in the floation of silceous gangue particles. The gangue containing froth is removed and the oxidized iron concentrate is recovered from the residue of the pulp.

Certain marked difficulties have been encountered in the methods of concentration as described above. The methods are very sensitive to the amount of starch, which must be carefully adjusted, not only to the varying proportions of the different minerals, but also to the degree of grind, and hence to the amount of slimes contained in the ore. The order of addition of the reagents and the time of conditioning, as well as the pulp consistency of conditioning, are important in attaining a satisfactory grade and recovery of the concentrates. While the various starch preparations have been not equally effective, it has been found that causticizing with one molar caustic soda gave better results than dispersing with heat. With an oxidized iron ore, essentially minus 325 mesh and approximately 50 to 55 percent iron, the optimum amount of starch required has been found to be in the range of 4 to 6 pounds of corn starch per ton of ore, which contributes to a large proportion of the reagent cost.

An object of the present invention is to provide a novel method for reducing the starch requirements for flotation concentration without affecting the grade and recovery of the concentrates. It has been discovered that the mechanical shearing of a starch suspension breaks down the molecular size of the starch, indicated by the lowering of the viscosity as shown in Table 1, and thus increases the coating efficiency at a given amount of addition. This results in a substantial decrease in the amount of starch required in the flotation, without sacrifice of concentration efficiency.

TABLE 1.—VISCOSITY OF STARCH SOLUTIONS AT 25° C.

| Type of Starch | Conc'n of Starch, percent | Conc'n of Caustic Soda, N. | Time of Homogenizing, min. | Viscosity Centipoise |
|---|---|---|---|---|
| Pearl | 2.0 | 1.0 | 0 | 31.08 |
| Do | 2.0 | 1.0 | 3 | 11.48 |
| Do | 2.0 | 1.0 | 7.5 | 9.430 |
| Do | 2.0 | 1.0 | 15 | 7.830 |
| Do | 2.0 | 1.0 | 30 | 6.024 |
| Do | 0.5 | 0.5 | 0 | 2.758 |
| Do | 0.5 | 0.5 | 15 | 1.617 |
| Milo | 0.5 | 1.0 | 0 | 3.148 |
| Do | 0.5 | 1.0 | 15 | 1.650 |
| Tapioca | 0.5 | 1.0 | 0 | 1.965 |
| Do | 0.5 | 1.0 | 15 | 1.701 |

Broadly stated, the present invention is directed to a process for preparing a starch solution for use as a modifying agent in the froth flotation of various types of ores by subjecting the starch solution to a violent shearing action. The starch is first gelatinized with either heat or caustic soda, as is well known and which per se forms no part of the present invention. Preferably the starch solution has a concentration between about 0.5 and 5 percent by weight in water. The starch may be gelatinized, for example, by dispersing starch in water, mixing with a caustic soda solution and agitating. Alternatively, a suspension of starch in water may be heated to gelatinize the starch.

The resulting solution of gelatinized starch, however, prepared, is then subjected to a violent shearing or tearing action. This may best be done by high speed mechanical agitation in a vessel whose paddles or blades are rotated at a speed of at least about 2000 r.p.m. and preferably higher. The violent shearing action is preferably continued for about 1 to 30 minutes. Although it has been found that the viscosity of the solution decreases with longer agitation, the rate of decrease becomes progressively smaller. Further treatment does not produce improved results commensurate with the added affort required. The shearing action disrupts the starch structure and reduces the particle molceular sizes. It homogenizes the solution by more uniformly dispersing the particles and results in the lowered viscosity.

The resulting treated starch solution is then added to pulped ore in an amount to incorporate about 0.5 to 6 pounds of starch per ton of ore. Preferably the lowest operable amount (depending upon particular ore, grind, etc.) is added because in most instances the moderately improved results from the use of greater amounts of starch are not sufficient to compensate for the greater reagent cost. The pH of the pulp is preferably relatively high at about 11 to 12. For this reason, the use of causticized starch is prefered so as to minimize the amount of added caustic needed to maintain the pH level. The ore pulp is then conditioned in the usual manner and the conditioned pulp is transferred to a flotation cell and floated. For optimum results the ore is preferably conditioned at about 30 to 50 percent solids and diluted to about 10 to 30 percent solids for floating. Optimum conditioning times are about two minutes after addition of the starch solution, about one minute with lime or calcium and about two minutes with the anionic collector.

The shearing treatment may be carried out batchwise on a laboratory scale by use of the well known Waring blender or similar devices. For commercial operation high speed mechanical blade type homogenizing, blending and agitating apparatus is available, both for batch and continuous operation.

The following examples illustrate the invention but are not to be construed as limiting the same.

Example 1

Eight parts by weight of pearl starch were dispersed in 200 parts by weight of water and then mixed with an equal volume of two molar caustic soda solution and agitated with a motor stirrer for 30 minutes. A half of the starch solution thus prepared was subjected to violent agitation by means of a high speed blender, operating at 4000 revolutions per minute, for a period of 15 minutes.

Two series of flotation tests were run on an oxidized iron ore, essentially minus 325 mesh and analyzing 51.77 percent iron and 20.30 percent acid insolubles, using the two types of starch solutions described above. A charge of the iron ore was pulped to 30 percent solids in a batch conditioner, a pre-designed amount of the starch was added, as indicated in the tables, and the pH of the pulp was adjusted to 11.8, either with caustic soda or hydrochloric acid, and conditioned for two minutes. This was followed by one minute conditioning with 2 pounds of calcium chloride per ton, and then two minutes with 0.5 pound per ton of Acintol FA–2, a commercially available fatty acid. The conditioned pulp was transferred to a flotation cell, diluted to 20 percent solids and floated for five minutes. The froth product was scavenged once using the supernatant water of the rougher flotation operation. The results of the flotation tests are given in Tables 2 and 3.

TABLE 2.—FLOTATION RESULTS USING CAUSTICIZED PEARL STARCH

| Starch, lb./ton | Products | Weight Percent | Fe Percent | Insol. Percent | Fe Recovery Percent |
|---|---|---|---|---|---|
| 2.0 | Concentrate | 32.73 | 60.76 | 6.43 | 39.42 |
|  | Scavenger Concentrate | 24.21 | 57.85 |  | 27.76 |
|  | Scavenger Froth | 43.06 | 38.46 |  | 32.82 |
|  | Composite | 100.00 | 50.46 |  | 100.00 |
| 4.0 | Concentrate | 71.22 | 62.70 | 3.14 | 88.77 |
|  | Scavenger Concentrate | 6.27 | 47.18 |  | 5.88 |
|  | Scavenger Froth | 22.51 | 11.96 |  | 5.35 |
|  | Composite | 100.00 | 50.30 |  | 100.00 |

TABLE 3.—FLOTATION RESULTS USING CAUSTICIZED AND HOMOGENIZED PEARL STARCH

| Starch, lb./ton | Products | Weight Percent | Fe Percent | Insol. Percent | Fe Recovery Percent |
|---|---|---|---|---|---|
| 1.0 | Concentrate | 33.26 | 59.14 | 8.63 | 39.17 |
|  | Scavenger Concentrate | 24.10 | 54.86 |  | 26.32 |
|  | Scavenger Froth | 42.64 | 40.64 |  | 34.51 |
|  | Composite | 100.0 | 50.22 |  | 100.00 |
| 2.0 | Concentrate | 66.01 | 62.54 | 3.25 | 82.13 |
|  | Scavenger Concentrate | 10.70 | 57.00 |  | 12.14 |
|  | Scavenger Froth | 23.29 | 12.36 |  | 5.73 |
|  | Composite | 100.00 | 50.26 |  | 100.00 |
| 4.0 | Concentrate | 72.10 | 62.54 | 3.13 | 89.75 |
|  | Scavenger Concentrate | 6.31 | 47.35 |  | 5.95 |
|  | Scavenger Froth | 21.59 | 10.02 |  | 4.30 |
|  | Composite | 100.00 | 50.24 |  | 100.00 |

Example 2

Eight parts by weight of milo starch were dispersed in 200 parts by weight of water and then mixed with an equal volume of two molar caustic soda solution and agitated with a motor stirrer for 30 minutes. A half of the starch solution thus prepared was subjected to violent agitation by means of a mechanical blender operating at 4000 revolutions per minute for a period of 15 minutes.

Two flotation tests were run on an oxidized iron ore, essentially minus 325 mesh and analyzing 55.53 percent iron and 14.23 percent acid insolubles, using the two types of milo starch solutions described above. A charge of the iron ore was ground in a batch rod mill for three minutes and the pulp consistency of the ground product was adjusted to 30 percent in a batch conditioner. Three pounds of the starch per ton were added, the pH was adjusted to 11.8, and the pulp was conditioned for two minutes. This was followed by one minute conditioning with 2 pounds of calcium chloride per ton and then two minutes with 0.8 pound per ton of Acintol FA–2 fatty acid. The conditioned pulp was transferred to a flotation cell, diluted to 20 percent solids and floated for five minutes. The flotation results using the above two milo starch solutions are compared in Table 4.

TABLE 4.—FLOTATION RESULTS USING MILO STARCH AS A DEPRESSANT

| Type of Treatment | Products | Weight Percent | Fe Percent | Insol. Percent | Fe Recovery Percent |
|---|---|---|---|---|---|
| Causticized | Concentrate | 33.57 | 59.80 | 7.36 | 36.33 |
|  | Froth | 66.43 | 52.95 |  | 63.67 |
|  | Composite | 100.00 | 55.25 |  | 100.00 |
| Causticized and Homogenized | Concentrate | 79.47 | 62.46 | 3.33 | 89.71 |
|  | Froth | 20.53 | 27.73 |  | 10.29 |
|  | Composite | 100.00 | 55.33 |  | 100.00 |

Example 3

Eight parts by weight of tapioca flour were dispersed in 200 parts by weight of water and then mixed with an equal volume of two molar caustic soda solution and agitated with a motor stirrer for 30 minutes. A half of the starch solution thus prepared was subjected to violent agitation by means of a commercial blender operating at 4000 revolutions per minute for a period of 15 minutes.

Two flotation tests were run on an oxidized iron ore, essentially minus 325 mesh and analyzing 55.53 percent iron and 14.23 percent acid insolubles, using the two types of tapioca flour solutions described above. A charge of the iron ore was pulped to 30 percent solids in a batch conditioner. Two pounds of the starch per ton were added, the pH was adjusted to 11.8, and the pulped ore was conditioned for two minutes. This was followed by one minute conditioning with two pounds of calcium chloride per ton and then two minutes with 0.8 pound per ton of Acintol FA-2 fatty acid. The conditioned pulp was transferred to a flotation cell, diluted to 20 percent solids and floated for five minutes. The flotation results using the above two tapioca flour solutions are compared in Table 5.

TABLE 5.—FLOTATION RESULTS USING TAPIOCA STARCH AS A DEPRESSANT

| Type of Treatment | Products | Weight Percent | Fe Percent | Insol. Percent | Fe Recovery Percent |
|---|---|---|---|---|---|
| Causticized | Concentrate | 37.63 | 61.82 | 4.30 | 41.99 |
|  | Froth | 62.37 | 51.53 |  | 58.01 |
|  | Composite | 100.00 | 55.39 |  | 100.00 |
| Causticized and Homogenized | Concentrate | 56.61 | 62.71 | 2.93 | 63.94 |
|  | Froth | 43.39 | 46.15 |  | 36.06 |
|  | Composite | 100.00 | 55.52 |  | 100.00 |

*Example 4*

Eight parts by weight of pearl starch were dispersed in 200 parts by weight of water and then mixed with an equal volume of one molar caustic soda solution and agitated with a motor stirrer for 5 minutes. The starch solution thus prepared was subjected to violent agitation by means of a high speed blender, operating at 4000 revolutions per minute, for a period of one, five, fifteen and thirty minutes.

Flotation tests were run on an oxidized iron ore, analyzing 55.21 percent iron and 14.70 percent acid insolubles, and with a size consisting of 85.81 percent passing 325 mesh, using the starch solutions described above. A charge of the iron ore was pulped to 30 percent solids in a batch conditioner, 3 pounds of starch (homogenized for different length of time as indicated in the table) per ton of ore was added, the pH of the pulp was adjusted to 11.5, either with caustic soda or hydrochloric acid, and conditioned for two minutes. This was followed by one minute conditioning with 2 pounds per ton of Acintol FA-2. The conditioned pulp was transferred to a flotation cell, diluted to 20 percent solids and floated for five minutes. The results of the flotation tests are given in Table 6.

TABLE 6.—FLOTATION RESULTS USING HOMOGENIZED PEARL STARCH

| Time of Homogenization | Products | Weight Percent | Fe Percent | Insol. Percent | Fe Recovery Percent |
|---|---|---|---|---|---|
| 0 Minute | Concentrate | 49.00 | 62.71 | 3.79 | 55.79 |
|  | Froth | 51.00 | 47.75 |  | 44.21 |
|  | Composite | 100.00 | 55.08 |  | 100.00 |
| 1 Minute | Concentrate | 76.45 | 62.80 | 3.55 | 87.34 |
|  | Froth | 23.55 | 29.56 |  | 12.66 |
|  | Composite | 100.00 | 54.97 |  | 100.00 |
| 5 Minutes | Concentrate | 78.30 | 62.31 | 4.28 | 88.76 |
|  | Froth | 21.70 | 28.19 |  | 11.24 |
|  | Composite | 100.00 | 55.97 |  | 100.00 |
| 15 Minutes | Concentrate | 69.40 | 63.04 | 3.03 | 79.67 |
|  | Froth | 30.60 | 36.49 |  | 20.33 |
|  | Composite | 100.00 | 54.92 |  | 100.00 |
| 30 Minutes | Concentrate | 56.10 | 62.56 | 3.86 | 63.96 |
|  | Froth | 43.90 | 45.04 |  | 36.04 |
|  | Composite | 100.00 | 54.87 |  | 100.00 |

It is apparnet that many modifications and variations of this invention as hereinbefore set forth may be made without departing from the spirit and scope thereof. The specific embodiments described are given by way of example only and the invention is limited only by the terms of the appended claims.

I claim:

1. In a method of concentrating finely-divided oxidized iron-ores in which the gangue material is principally siliceous which comprises conditioning an aqueous pulp of the ore with a starch solution, conditioning with a calcium ion activating reagent, conditioning with an anionic collecting agent, subjecting the thus treated ore pulp to froth flotation, removing the gangue containing froth and producing an oxidized iron concentrate in the residue of the pulp, the improvement which permits attainment of good metallurgical results with reduced amounts of starch and consists in preparing said starch solution by first gelatinizing starch and thereafter subjecting the starch solution to a violent shearing action to decrease the viscosity of the starch solution and increase its depressant action.

2. The method of claim 1 further characterized in that said starch is gelatinized by causticizing by treatment with a strong aqueous alkali solution.

3. The method of claim 1 further characterized in that said starch solution has a concentration between about 0.5 and 5 percent and is added to said ore pulp in the proportion of about 0.5 to 6 pounds of starch per ton of ore.

4. The method of claim 1 further characterized in that said starch solution is subjected to violent shearing action by vigorous agitation at the rate of at least 2000 r.p.m. for about 1 to 30 minutes.

5. The method of concentrating finely-divided oxidized iron ores in which the gangue material is principally siliceous, which method comprises
   (A) preparing a starch solution to decrease its viscosity and increase its depressant action by
      (1) dispersing starch in water and gelatinizing and then
      (2) subject to violent shearing action,
   (B) alkalizing an aqueous pulp of the ore to a pH of about 11 to 12 and conditioning with said starch solution
      (1) said starch being added in the proportion of about 0.5 to 6 pounds of starch per ton of ore, said starch being added in substantially lesser amount than the amount of gelatinized starch not subjected to shearing required to produce the same metallurgical results,
   (C) conditioning said pulp with a calcium ion activating reagent, (D) conditioning said pulp with an anionic collecting agent,
(E) subjecting the thus treated ore to froth flotation,
(F) removing the gangue containing froth, and
(G) recovering the oxidized iron ore concentrate.

6. The method of claim 5 further characterized in that said starch is gelatinized by causticizing by treatment with a strong aqueous alkali solution.

7. The method of claim 5 further characterized in that said starch solution is subjected to violent shearing action by vigorous agitation at the rate of at least 2000 r.p.m. for about 1 to 30 minutes.

8. In the method of separating minerals from their ores by froth flotation in which starch is utilized as a depressant, the improvement which permits attainment of good metallurgical results with reduced amounts of starch and consists in preparing an aqueous solution of said starch by first gelatinizing the starch and thereafter subjecting the starch solution to a violent shearing action to decrease the viscosity of the starch solution and increase its depressant action.

9. The method of claim 8 further characterized in that said starch is gelatinized by causticizing by treatment with a strong aqueous alkali solution.

10. The method of claim 8 further characterized in that said starch solution has a concentration between about 0.5 and 5 percent and is added to said ore pulp in the proportion of about 0.5 to 6 pounds of starch per ton of ore, said starch being added in substantially lesser amount than the amount of gelatinized starch not subjected to shearing required to produce the same metallurgical results.

11. The method of claim 8 further characterized in that said starch solution is subjected to violent shearing action by vigorous agitation at the rate of at least 2000 r.p.m. for about 1 to 30 minutes.

References Cited

UNITED STATES PATENTS

| | | | |
|---|---|---|---|
| 2,364,777 | 12/1944 | Brown | 209—166 |
| 2,497,863 | 2/1950 | Clemmer | 209—166 |
| 2,555,825 | 6/1951 | Sullivan | 209—166 X |
| 3,105,778 | 10/1963 | Anderson | 260—233.3 X |
| 3,137,592 | 6/1964 | Protzman | 260—233.3 X |
| 3,175,928 | 3/1965 | Lancaster | 260—233.3 X |

FRANK W. LUTTER, *Primary Examiner.*

HARRY B. THORNTON, *Examiner.*

R. HALPER, *Assistant Examiner.*

UNITED STATES PATENT OFFICE
CERTIFICATE OF CORRECTION

Patent No. 3,371,778                                  March 5, 1968

Iwao Iwasaki

It is hereby certified that error appears in the above numbered patent requiring correction and that the said Letters Patent should read as corrected below.

Column 1, line 14, for "floation" read -- flotation --; line 17, for "gelationized" read -- gelatinized --; line 24, for "methd" read -- method --; line 29, for "fluororspar" read -- fluorspar --; line 36, for "collector" read -- collectors --; line 44, for "floation" read -- flotation --; same line 44, for "silceous" read -- siliceous --; column 2, line 41, for "affort" read -- effort --; line 54, for "prefered" read -- preferred --; line 63, after "calcium" insert -- chloride --; column 5, line 7, for "starch" read -- flour --; line 64, for "apparnet" read -- apparent --.

Signed and sealed this 22nd day of July 1969.

(SEAL)
Attest:

EDWARD M. FLETCHER, JR.                        WILLIAM E. SCHUYLER, JR.
Attesting Officer                                  Commissioner of Patents